(12) United States Patent
Lv

(10) Patent No.: US 12,124,893 B2
(45) Date of Patent: Oct. 22, 2024

(54) CLIPBOARD DATA REDIRECTION BETWEEN VIRTUAL DESKTOPS

(71) Applicant: VMware, Inc., Palo Alto, CA (US)

(72) Inventor: Lin Lv, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/902,870

(22) Filed: Sep. 4, 2022

(65) Prior Publication Data
US 2024/0004731 A1    Jan. 4, 2024

(30) Foreign Application Priority Data

Jul. 4, 2022    (WO) ................ PCT/CN2022/103586

(51) Int. Cl.
*G06F 9/54*     (2006.01)
*G06F 9/451*    (2018.01)
*H04L 67/00*    (2022.01)

(52) U.S. Cl.
CPC .............. *G06F 9/543* (2013.01); *G06F 9/452* (2018.02); *H04L 67/34* (2013.01)

(58) Field of Classification Search
CPC ........... G06F 9/543; G06F 9/452; H04L 67/34
See application file for complete search history.

(56) References Cited

U.S. PATENT DOCUMENTS

| 8,964,947 | B1* | 2/2015 | Noolu | H04L 67/06 379/88.01 |
| 11,057,464 | B1* | 7/2021 | Wei | G06F 3/0656 |
| 2012/0192176 | A1* | 7/2012 | Shah | G06F 9/452 718/1 |
| 2013/0036167 | A1* | 2/2013 | Bazot | G06F 9/543 709/204 |
| 2014/0267339 | A1* | 9/2014 | Dowd | G06F 9/543 709/219 |
| 2015/0012861 | A1* | 1/2015 | Loginov | G06F 9/543 715/770 |
| 2015/0095795 | A1* | 4/2015 | Zhang | G06F 9/543 715/748 |
| 2016/0019104 | A1* | 1/2016 | Major | G06F 21/6218 719/319 |
| 2016/0088064 | A1* | 3/2016 | Chen | H04L 67/568 709/204 |
| 2018/0322137 | A1* | 11/2018 | Todd | G06F 16/176 |

(Continued)

*Primary Examiner* — Rami R Okasha
(74) *Attorney, Agent, or Firm* — Kim & Stewart LLP

(57) ABSTRACT

Techniques are described for sharing clipboard data by redirecting it between different virtual desktop sessions. A first user establishes a first desktop session and submits a request to share their clipboard data with a second user working on a second virtual desktop session. The request to share clipboard data is transmitted from the first desktop session to a connection server, where it is determined whether the second user currently has any active virtual desktop sessions. If so, the connection server forwards the request to all active virtual desktop sessions of the second user, where the second user is provided with an option to approve or deny the request. If the second user approves the clipboard redirection request, the connection server notifies the first virtual desktop session, and a virtual channel of a remote display protocol can be established for sharing the clipboard data.

18 Claims, 5 Drawing Sheets

(56) References Cited

U.S. PATENT DOCUMENTS

| | | | |
|---|---|---|---|
| 2018/0335998 A1* | 11/2018 | Callaghan | H04L 67/1095 |
| 2019/0068390 A1* | 2/2019 | Gross | H04L 12/1827 |
| 2021/0042171 A1* | 2/2021 | Shah | H04L 67/1095 |
| 2021/0297475 A1* | 9/2021 | Bai | H04L 67/306 |
| 2022/0311822 A1* | 9/2022 | Nord | H04L 67/306 |

* cited by examiner

CLIPBOARD DATA REDIRECTION BETWEEN VIRTUAL DESKTOPS

CLAIM OF PRIORITY

This application is based upon and claims the benefit of priority from International Patent Application No. PCT/CN2022/103586, filed on Jul. 4, 2022, which is incorporated by reference herein in its entirety.

TECHNICAL FIELD

The present disclosure generally relates to virtual desktop environments and more specifically to techniques for sharing clipboard data between different virtual desktop sessions.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There are many implementations of desktop virtualization, some of which offer a full desktop while others provide individual remotely accessible applications. Regardless of the implementation, a common characteristic of these technologies is that the application execution takes place on remote host server usually located in a data center, while the user uses a local client device to access the application over a network connection. For example, in a conventional VDI deployment, each user in an enterprise is provisioned a virtual desktop and is allowed to access their virtual desktop over a network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remote display protocol, such as Remote Desktop Protocol (RDP), PC-over-IP protocol (PCoIP), VMware Blast, virtual network computing (VNC) protocol, or the like. Using the remote display protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

One of the features available in some VDI deployments is the ability synchronize the clipboard on the local client device with the clipboard of the remote desktop. This feature is sometimes referred to as "clipboard redirection" and usually involves a process for sending the clipboard data over the network between the virtual desktop and the client device so that the data is available between the client and the virtual desktop. In this manner, if a user accessing their virtual desktop from a remote client device wishes to cut/copy data from their virtual desktop and paste it to their client device or vice versa, the user is able to do so seamlessly without having to manually move any data, files, or folders between the client device and the virtual desktop.

Conventionally, the clipboard redirection feature is only able transfer clipboard data between the client device and the remote desktop of the same user. If end users working on different remote desktops want to share some text, image, files, or folders with colleagues who are also using remote desktops, a common way for sharing these items is via an Instant Messaging (IM) tool, such as Slack®, Microsoft® Teams, Skype®, or the like. However, this approach has a number of disadvantages. First, users need to install IM software on their remote desktop, or such software needs to be provided by the administrator. Without such IM tools, sharing data and files can be inconvenient for various other reasons. Even if users are able to get IM software installed, sharing the data involves numerous steps. For example, users need to manually transfer the data/file for sharing into the IM tool, and then click to send it. On receiving side, the user needs to transfer the received data from the IM tool into their remote desktop before using it. In order to share a large folder via IM, users must typically ZIP (compress) it before sharing. It is not efficient to transfer data/file between remote desktops via IM tools because remote desktops are usually deployed on an intranet whereas the IM server is accessible via the Internet. That means transferring data via IM can take a substantial amount of time. Finally, using IM consumes network bandwidth because the IM server is typically deployed on the Internet. That means more network bandwidth consumption if the remote desktops are deployed on the public cloud. Alternative methods of sharing files and data between virtual desktops are desirable.

DETAILED DESCRIPTION

Figure 1:
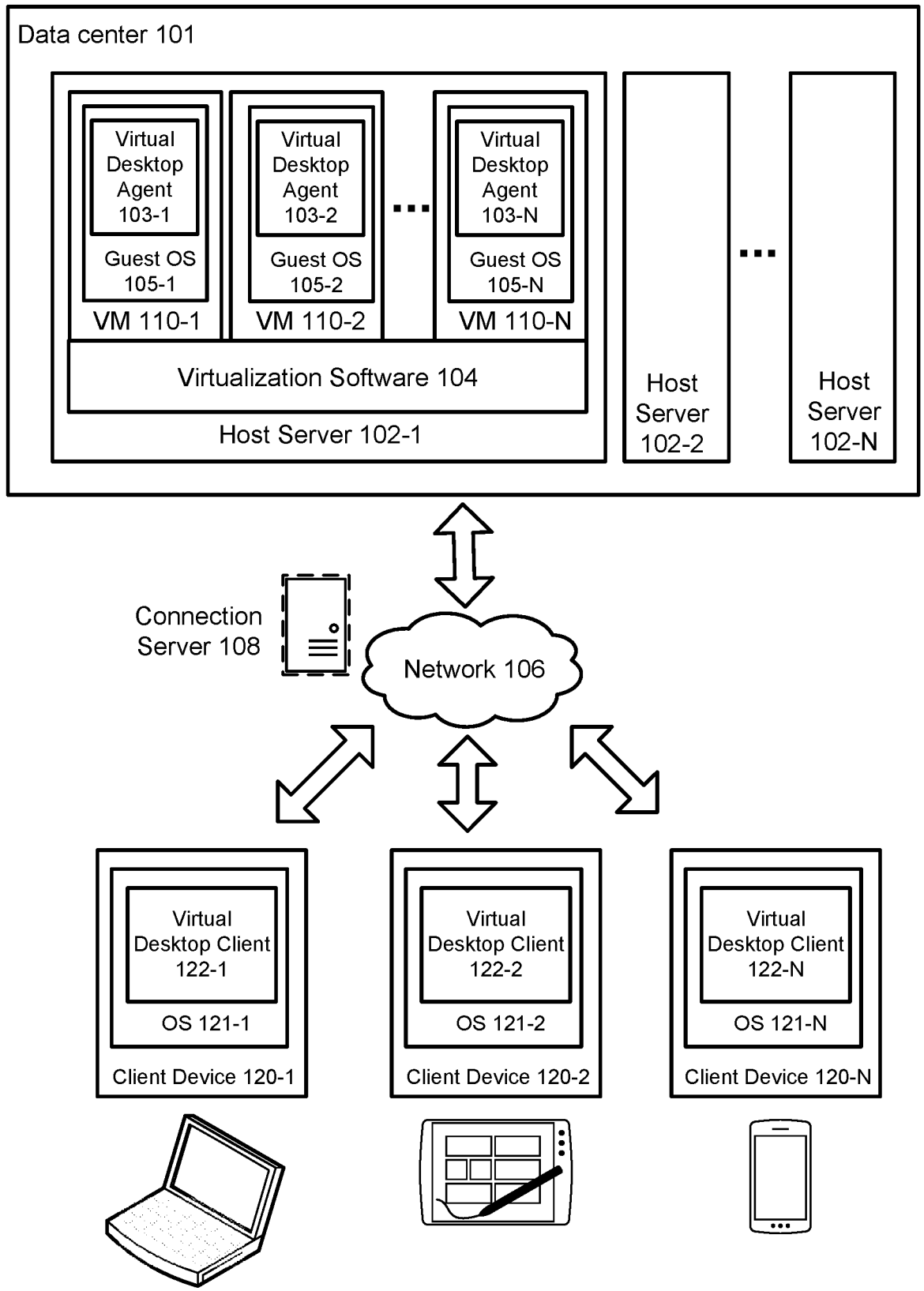
FIG. 1 illustrates an example of a virtual desktop environment, in accordance with various embodiments.

Systems and methods in accordance with various embodiments described herein overcome at least some of the deficiencies described above by providing ways to share clipboard data by redirecting it between different virtual desktop sessions. In various embodiments, a user establishes a first desktop session and submits a request to share their clipboard data with a second virtual desktop session (e.g. the desktop session of a different user that is currently logged into their respective desktop session). For example, the first user may click on a user interface (UI) element displayed on the desktop to start sharing the clipboard data and select a second user with whom they wish to share the clipboard. The request to share clipboard data is transmitted from the first desktop session to a connection server, where it is determined whether the second user currently has any active virtual desktop sessions. If the connection server determines that the second user has at least one active desktop session, the connection server forwards the request to all active virtual desktop sessions of the second user, where the second user is provided with an option to approve or deny the request. If the second user approves the request to share clipboard data, the connection server notifies the first virtual desktop session by sending a response to the first virtual desktop session, indicating that the request to share the clipboard data has been approved and providing the information about the second virtual desktop session. The first virtual desktop session is then able to contact the second virtual desktop session in order to establish a virtual channel of a remote display protocol for sharing the clipboard data.

Once the virtual channel has been set up, clipboard data can be redirected from the first virtual desktop session to the second virtual desktop session over the virtual channel. In various embodiments, when the first user performs a cut or copy operation, such as by pressing Ctrl-C, data is placed within the clipboard of the guest operating system (OS) of the first virtual desktop session. If the data comprises text or an image, the data is immediately redirected (copied) to the clipboard of the guest OS of the second virtual desktop session. The second user can then be notified that data has been redirected from the first virtual desktop session and is available for pasting within the second virtual desktop session. The second user is then able to perform a paste operation (e.g. by pressing Ctrl-V or otherwise) and the redirected data will be retrieved from the clipboard of the second virtual desktop session and pasted in the appropriate location that was selected by the second user.

In one embodiment, if the copied data comprises file(s) or folder(s), only the path(s) of the file/folder is redirected to the clipboard of the second virtual desktop session at first. Then once the second user performs a paste operation within the second virtual desktop session, a request is sent from the second virtual desktop session to the first virtual desktop session to retrieve the content of the file/folder. In response to the paste request, the actual content of the file/folder is redirected to the clipboard of the second virtual desktop session. This can be advantageous particularly in cases where the files or folders are large in size and transferring them will use a lot of resources and take a significant amount of time. Delaying the transfer of the contents until a paste operation is performed provides a better user experience and, in some cases, may avoid the data transfer altogether, such as in situations where a user changes their mind after having copied the data into the clipboard.

In some embodiments, it is preferable to notify the second user each time that data is redirected to the clipboard of the second virtual desktop session so that the second user is aware that data has changed within their clipboard. For example, in some embodiments, the second user may be asked for approval each time that data is transferred to their clipboard. Alternatively, in other embodiments, once the second user provides an initial approval to share the clipboard, a simple notification is triggered each time that data is transferred to their clipboard.

After some time, the first user or the second user may wish to terminate the clipboard redirection by clicking on the appropriate UI element within their virtual desktop session. At that time, a notification is sent between the virtual desktop sessions, notifying the other user that the clipboard redirection has ended, and the data will no longer be redirected between the virtual desktops.

In an alternative embodiment, instead of sharing the clipboard data between different users, the first may user wish to share the clipboard data with a second virtual desktop session that the same first user is logged into. This can be performed via the same process as above, with the connection server sending a request to share data to the second virtual desktop session of the first user and providing the first user an option to approve or deny the request within the second virtual desktop session. Similarly as before, if the request is approved, a virtual channel is established between the two virtual desktop sessions of the first user and used for redirecting the clipboard data. The redirection can be terminated by the first user from either the first virtual desktop session or from within the second virtual desktop session.

In various embodiments, the clipboard redirection between multiple virtual desktop sessions can work in conjunction with and supplement conventional clipboard redirection, which enables clipboard data to be redirected from the client device to the virtual desktop session and the virtual desktop session to the client device. For example, the first user may select data (e.g. text, image, file, or folder) on their client device and cut/copy the data, which will cause the client device to redirect the clipboard data to their first virtual desktop session. The first user may then share the clipboard data with the second user, where the clipboard data will be redirected to the second virtual desktop session of the second user, as described above. Furthermore, if the second user also has conventional clipboard redirection enabled from the virtual desktop to their client device, the clipboard data will also be copied to the clipboard of the second user's client device and the second user will be able to past the data locally on their client device.

It should be noted that throughout this disclosure the cut/copy operation may in some cases be referred to simply as a copy operation for readability purposes, however it will be understood by a person of ordinary skill in the art that copy operations and cut operations are both covered by the various embodiments described in this disclosure.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. The client devices (120-1, 120-2, 120-N) establish virtual desktop sessions with the host servers (102-1, 102-2, 102-N) by first contacting the connection server 108. In various embodiments, the connection server 108 acts as a broker for client connections by authenticating users through Windows Active Directory (AD) and directing the request to the appropriate host server hosting the virtual machine running the virtual desktop that the user is entitled to access.

Network 106 may be a wide area network (WAN), or other form of remote communication link between the host servers (102-1, 102-2, 102-N) and client devices (120-1, 120-2, 120-N). Network 106 may further include numerous other components, such as one or more firewalls, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS). The connection server 108 can be deployed inside the corporate firewall or may be deployed as a security server in the demilitarized zone (DMZ), or may be deployed in various other locations.

Once the virtual desktop sessions have been established, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote display protocol, such as Remote Desktop Protocol (RDP), PC-over-IP protocol (PCoIP), VMware Blast protocol, Virtual Network Computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
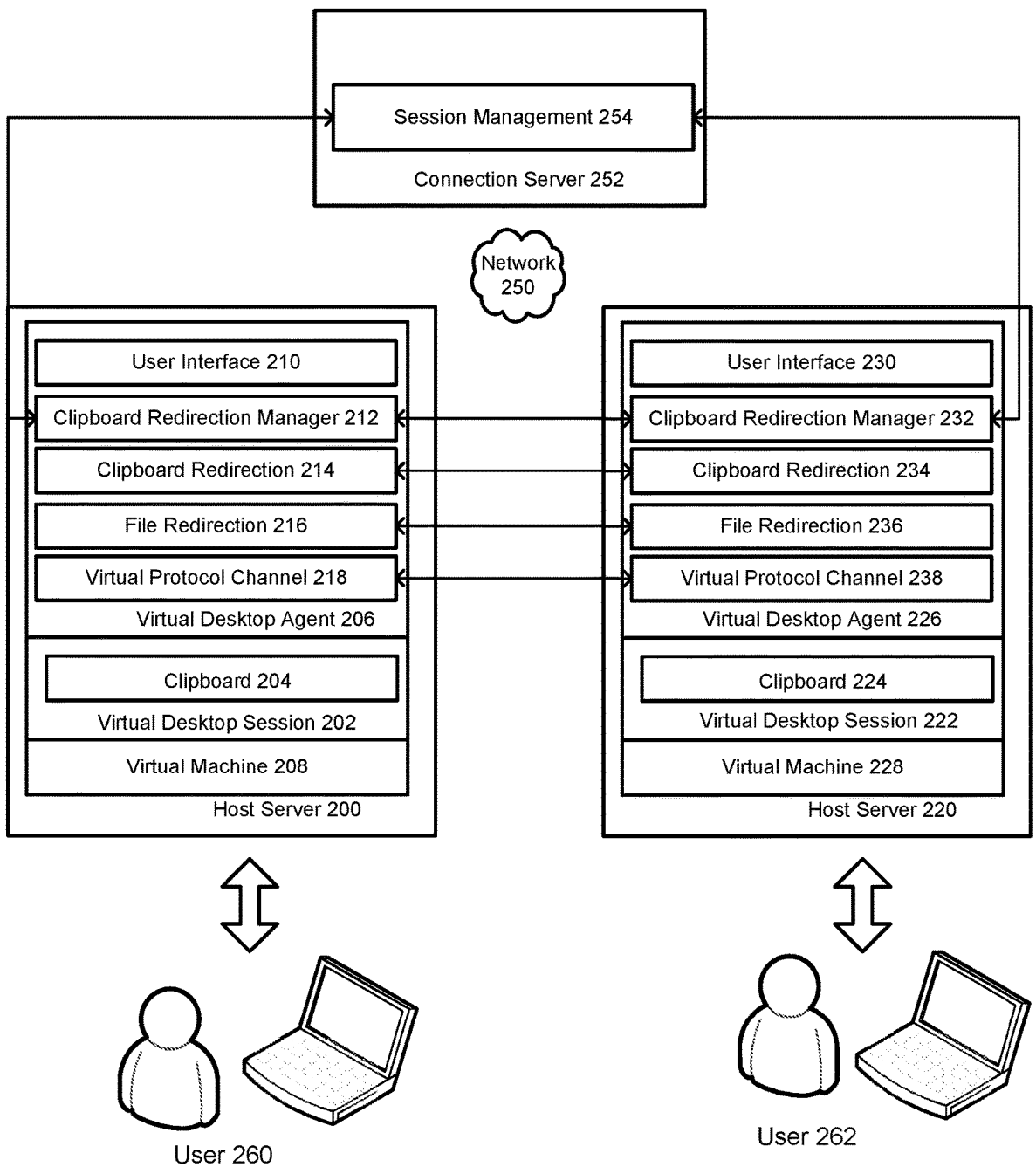
FIG. 2 is an illustration of various components that enable clipboard redirection between virtual desktop sessions, in accordance with various embodiments.

FIG. 2 is an illustration of various components that enable clipboard redirection between virtual desktop sessions, in accordance with various embodiments. As illustrated, the connection server 252 provides the session management 254 to enable clipboard redirection between desktops. This session management 254 module is also responsible for authorizing and managing sessions between local client device of the user and the remote virtual desktop. As shown in the illustration, a user 260 using their client device may contact the session management module 254 over the network 250 in order to log into their virtual desktop session 202 running on a virtual machine 208 hosted on host server 200 and begin using their virtual desktop, which is enabled by virtual desktop agent 206, as previously described. Similarly, user 262 may contact the session management module 254 in order to log into their virtual desktop session 222 running on VM 228 hosted on host server 220 and begin using their desktop as enabled by virtual desktop agent 226.

In the illustrated embodiment, when user 260 accessing their virtual desktop session 202 requests to redirect their clipboard 204 to user 262, the request is first sent to the session management module 254 on the connection server 252. Connection server 252 checks whether user 262 has any active remote desktop sessions. If the connections server determines that user 262 does have at least one active virtual desktop session, it will send a notification to all active virtual desktop sessions of user 262, such as virtual desktop session 222. User 262, who is working on virtual desktop session 222, receives the notification of the request to share the clipboard from user 260 and is provided with options to approve or deny the request. If user 262 approves the request, the connection server 252 will notify the virtual desktop session 202 with the information identifying the virtual desktop session 222. Virtual desktop session 202 is then able to contact virtual desktop session 222 directly to establish a virtual channel (218, 238) for clipboard redirection between clipboards 204 and 224. The virtual channel is a communication channel of the remote display protocol (e.g. RDP, PCOIP, Blast) established between two endpoints (218, 238) and used for transferring a specific type of data. In this case, the virtual channel will be used to redirect the clipboard data between clipboard 204 and clipboard 224.

User Interface

As shown in the illustration, a user interface component (210, 230) is provided on each virtual desktop session to enable users to manage clipboard redirection sharing. The user interface is implemented so that users on remote desktops can perform at least the following operations: (1) send requests to other users for redirecting the clipboard of the current virtual desktop session; (2) get a notification when another user sends a request to share their clipboard with the user, as well as be provided with an option to approve or deny the request; (3) display notifications when receiving clipboard data from another remote desktop; and (4) manage clipboard redirection, such as by checking the status of clipboard redirection or stopping active clipboard redirection.

Clipboard Redirection Manager

In the illustrated embodiment, the clipboard redirection manager (212, 232) operating on each virtual desktop session enables the clipboard redirection sharing between different virtual desktops. When user 260 requests to redirect clipboard 204 to user 262 using the UI element 210, the request is first sent to clipboard redirection manager 212 and the clipboard redirection manager 212 then forwards the request to the connection server 252. The connection server 252 checks if there are any active virtual desktops for user 262 and sends the request to all active virtual desktops for user 262, including the active virtual desktop session 222, as shown. The clipboard redirection manager 232 on the virtual desktop session 222 of user 262 will handle this request and invoke the user interface 230 to notify user 262. Once user 262 approves the request, the response will be sent to the clipboard redirection manager 212 of virtual desktop session 202 of user 260. The virtual desktop sessions 202 and 222 will then establish virtual protocol channel as previously described.

Once the virtual channel for clipboard transfer is established, the clipboard redirection manager 212 will monitor the clipboard 204 on virtual desktop session 202. If any new data is placed into the clipboard 204 (such as by a cut or copy operation), the clipboard redirection manager will dispatch it to Clipboard Redirection module (214, 234) for data transfer. In various embodiments, the clipboard redirection manager (212, 232) in each session maintains information about the target user, desktop session, and virtual channel, such that it can dispatch the data transfer correctly with required info to enable clipboard redirection sharing between different virtual desktop sessions.

Clipboard Redirection Module

The clipboard redirection module (214, 234) is configured to actually perform the data transfer between the clipboards 204 and 224, as well as enable clipboard redirection between the user's client device and the virtual desktop. This module is responsible for transferring the data of clipboard on the current virtual desktop to other virtual desktops. When user 260 on virtual desktop 202 cuts/copies (e.g. presses Ctrl+C) some data to clipboard 204, the clipboard redirection module 214 will be informed by the clipboard redirection manager 212 to transfer the clipboard data to target virtual desktops, including virtual desktop 222. To do this, the clipboard redirection module 214 will first access clipboard 204 and get the data format in clipboard 204. For example, in the Windows® operating system (OS), the standard clipboard data format "CF_BITMAP/CF_DM" indicates the data in clipboard 204 is a picture/image. The format "CF_H-DROP" means the data is a file or folder. The format "CF_UNICODETEXT" indicates that the data in the clipboard is text. If the data is a text or image, the clipboard redirection module 212 will communicate and transfer the data directly via virtual protocol channel 218. On the other hand, when user 260 tries to copy a file/folder, the clipboard only contains the information identifying the file/folder, such as data format, file/folder path, and the like. It does not contain the actual data of the file/folder at first. The contents of the file/folder transferring actually happens when the user on target virtual desktop session 222 performs a paste operation (e.g. presses Ctrl+V). The file transferring is performed by the module file redirection (216, 236). Once the clipboard data transfer is complete, the clipboard redirection module 234 on the target virtual desktop 222 will inform the clipboard redirection manager 232 on target desktop 222 that will accordingly send a notification message to UI 230 so that the target user 262 can be notified of this newly incoming clipboard data.

File Redirection Module

The file redirection module (216, 236) module is implemented to transfer the content file/folder to target remote desktop when user tries to redirect the file/folder to another user via clipboard. This module works by mapping the file/folder to target virtual desktop so that the file/folder can be accessed and pasted to the target virtual desktop. In one embodiment, the content of the file/folder are encrypted before being transmitted over the virtual channel (218, 238).

Virtual Protocol Channel

In virtual desktop infrastructure (VDI), the virtual protocol channel is implemented to perform data transfers between the client device and the remote desktop. Conventionally, a virtual channel is set up according to the remote display protocol, such as Microsoft® Remote Desktop Protocol (RDP), PCoIP, or VMware® Blast. In various embodiments described herein, the implementation of the virtual protocol channel can be modified so that the virtual protocol channel can be established between two virtual desktops rather than between the client device and the virtual desktop session. In order to do that, the endpoints of the virtual channel (218, 238) are deployed on each virtual desktop session in order to enable data to be transferred between virtual desktop session 202 and 222. In one embodiment, the data transferred over the virtual channel is encrypted for security.

Figure 3:
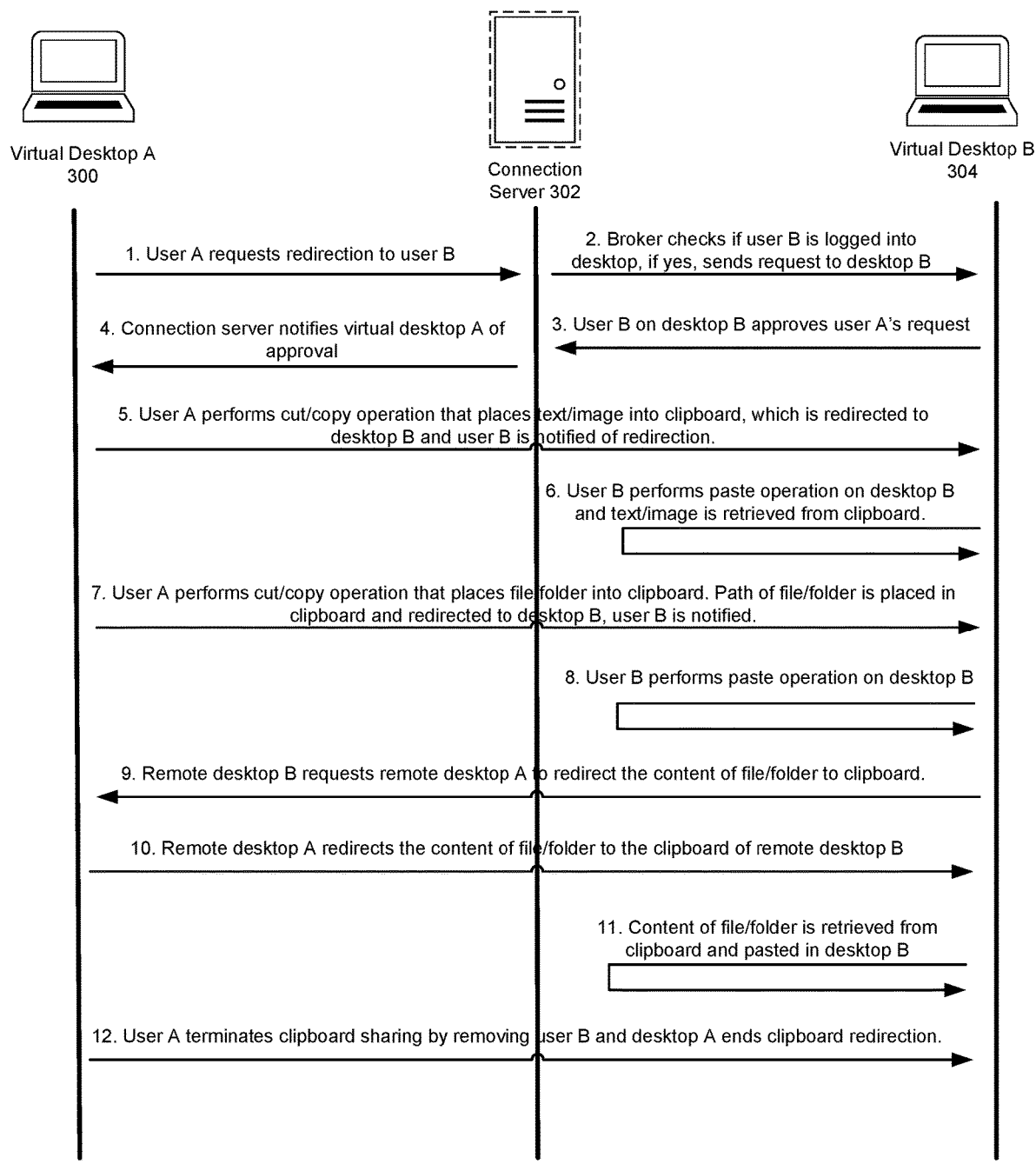
FIG. 3 is an example illustration of the process flow during clipboard redirection between virtual desktops, in accordance with various embodiments.

FIG. 3 is an example illustration of the process flow during clipboard redirection between virtual desktops, in accordance with various embodiments. As shown in step (1), the user A on virtual desktop A 300 requests to share the clipboard data with user B working on virtual desktop B 304. The request is sent from virtual desktop A (300) to connection server 302. In step (2), the connection server 302 checks if user B is logged into their active virtual desktop session 304 and if the user B is actively logged in, the connection server 302 sends the request to virtual desktop B 304. The user B is then displayed with a notification informing user B of the request from user A, as well as providing user B an option to accept or deny the request.

In step (3), the user B accepts the request on virtual desktop B 304 and the response is sent from virtual desktop B 304 to connection server 302. In step (4), the connection server 302 notifies virtual desktop A 300 of the approval. The user A is then displayed a notification on the UI element, indicating that user B has approved their request to share the clipboard data.

In step (5), the user A performs a cut/copy operation that places text or an image into the clipboard of virtual desktop A 300. Since the data is text or an image, the clipboard data is immediately redirected (copied) to the clipboard of virtual desktop B 304 and user B is notified of the redirection. In step (6), the user B can then perform a paste operation and the clipboard data that has been redirected from virtual desktop A is retrieved from the clipboard of virtual desktop B and pasted in the appropriate application or window selected by user B. It should be noted that if user B has clipboard redirection enabled between their client device and the virtual desktop B, then the user B can also paste the clipboard data locally on their client device.

In step (7), user A performs a cut/copy operation that places a file or folder into the clipboard of virtual desktop A 300. As previously discussed, because the data type is file/folder, rather than immediately redirecting the actual content of the file/folder into the clipboard, only information identifying the file/folder (e.g. the path identifying the location of the file/folder in the directory structure) is redirected to the clipboard of virtual desktop B 304 at first. The user B is also notified of the redirection. In step (8), user B performs a paste operation on virtual desktop B 304. In step (9), the virtual desktop B 304 requests the content of the file/folder from virtual desktop A 300 in response to the paste operation. The request for the content is performed using the information identifying the file/folder (e.g. path). In step (10), the virtual desktop A 300 redirects the content of the file/folder to the virtual desktop B 304 and in step (11), the file/folder is retrieved from the clipboard of virtual desktop B 304 and pasted into the appropriate location that was selected by user B.

In step (12), user A terminates clipboard sharing by removing user B from the list of users allowed to share the clipboard. The virtual desktop A 300 sends the notification to virtual desktop B 304 which is displayed to user B and the clipboard redirection is discontinued. It should be noted that user B on virtual desktop B 304 may also terminate clipboard redirection, in which case the notification would be sent from virtual desktop B 304 to virtual desktop A 300 and user A would be notified of the termination.

It should be noted that although the above example was described in terms of interactions between two different users A and B, this is not a limitation to the various embodiments described herein. In some embodiments, the clipboard sharing may be performed by a single user that is accessing two virtual desktop sessions. In that case, the same user would perform the functions of each user on the respective virtual desktop session A and B.

Figure 4:
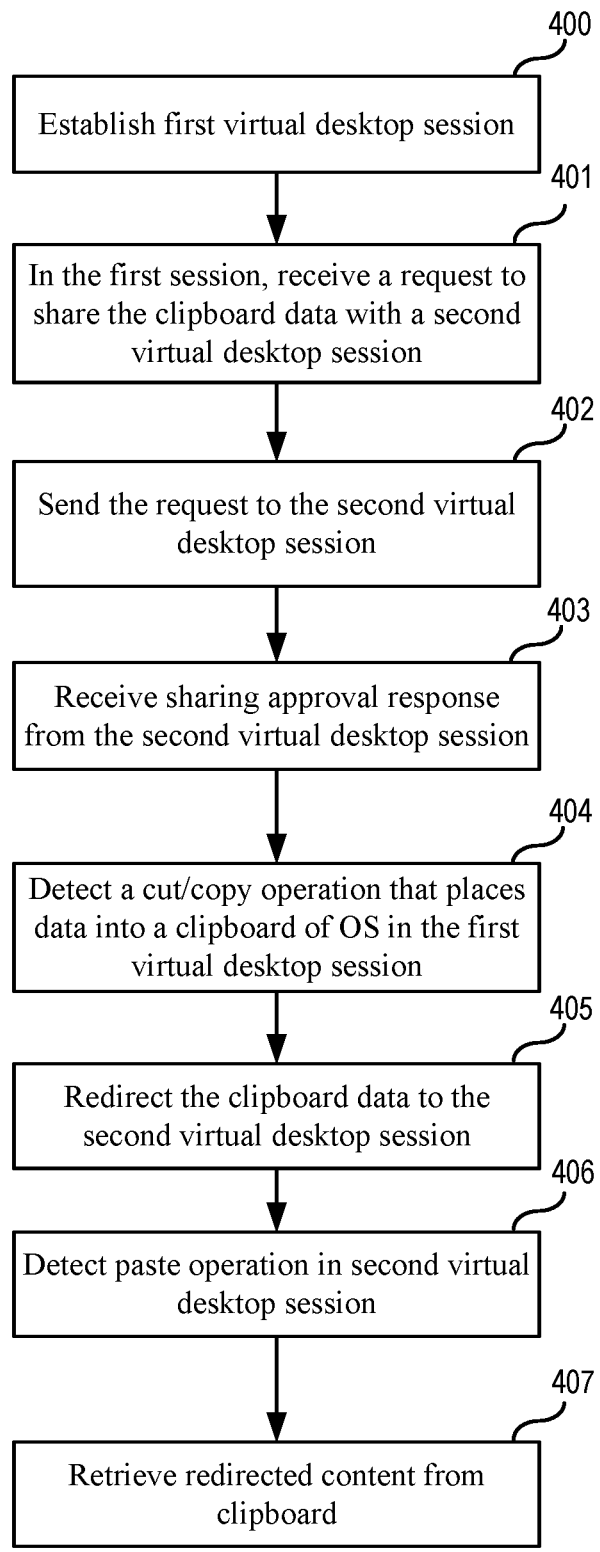
FIG. 4 is a flowchart example of clipboard redirection between virtual desktops, in accordance with various embodiments.

FIG. 4 is a flowchart example of clipboard redirection between virtual desktops, in accordance with various embodiments. In operation 400, a first virtual desktop session is established, such as by a user logging into their virtual desktop. In operation 401, the user submits a request in the first virtual desktop session to share the clipboard data with a second virtual desktop session. For example, the first user on the first virtual desktop session may identify a second user to share the clipboard data with. The request may be received by a clipboard redirection manager service operating on the first virtual desktop session, which can then forward the request to the connection server, as previously discussed.

In operation 402, the request is sent to the second virtual desktop session. For example, the connection server may first determine that the second user is actively logged into the second virtual desktop session and send the request to the second virtual desktop session. The second user is then notified of the request and given the option of approving or denying the request. If the second user approves the request, the first virtual desktop session is notified of the approval by the connection server, as shown in operation 403.

In operation 404, a cut or copy operation is detected on the first virtual desktop session. In operation 405, the clipboard data is redirected to the second virtual desktop session. As previously described, if the clipboard data is text or an image, the text or image may be immediately redirected to the clipboard of the second virtual desktop session. On the other hand, if the data is file or folder, then only information identifying the file or folder is redirected to the second virtual desktop session at this point.

In operation 406, a paste operation is detected on the second virtual desktop session. In operation 407, the clipboard data is retrieved from the clipboard on the second virtual desktop session. As noted above, if the clipboard data is text or image, the data is immediately available for pasting within the second virtual desktop session. If the data is information identifying a file or folder, then the second virtual desktop session requests the contents of the file or folder from the first virtual desktop session, as previously described. Once the data has been transferred, the file/folder is available for pasting in the second virtual desktop session.

Figure 5:
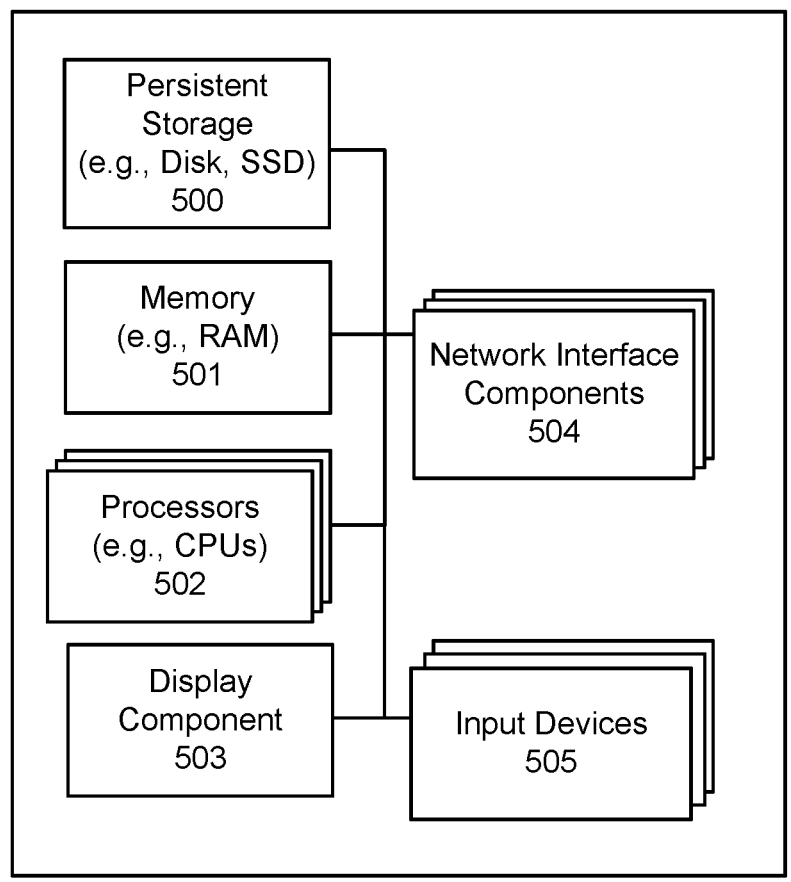
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random-access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for sharing clipboard data between virtual desktop sessions, the method comprising:

in a first virtual desktop session authenticated by a connection server for a first user on a first client device, receiving a request to share the clipboard data with a second virtual desktop session authenticated by the connection server for a second user on a second client device;

sending, by the connection server, the request to the second virtual desktop session;

displaying, on the second virtual desktop session, an indication that the clipboard data of the first virtual desktop session is requested to be shared with the second virtual desktop session and an option for the second user to approve the request to share the clipboard data;

receiving, from the connection server, a response from the second virtual desktop session to the first virtual desktop session, indicating that the request to share the clipboard data has been approved and identifying the second virtual desktop session;

establishing, based on the response by a first endpoint on the first client device in cooperation with a second endpoint on a second client device, a virtual channel between the first virtual desktop session and the second virtual desktop session;

detecting a cut/copy operation that places data into a clipboard of an operating system (OS) of the first virtual desktop session; and redirecting the data in the clipboard of the first virtual desktop session to a clipboard of the second virtual desktop session over the virtual channel.

2. The method of claim 1, wherein the data is an image or text, and further comprising:

in the second virtual desktop session,
receiving the image or text from the first virtual desktop session and storing the received image or text into the clipboard of an OS of the second virtual desktop session;
detecting a paste operation; and
retrieving the image or text from the clipboard of the second virtual desktop session in response to the paste operation.

3. The method of claim 1, wherein the data is a file or folder, and further comprising:

in the second virtual desktop session,
receiving a path associated with the file or folder from the first virtual desktop session and storing the path into the clipboard of an OS of the second virtual desktop session;
detecting a paste operation;
sending, to the first virtual desktop session, a request to transfer the content of the file or folder from the first virtual desktop session to the second virtual desktop session, the request including the path; and
receiving the content of the file or folder from the first virtual desktop session in response to the request.

4. The method of claim 1, wherein redirecting the data in the clipboard of the first virtual desktop session to the clipboard of the second virtual desktop session further comprises:

transmitting the data in the clipboard of the first virtual desktop session to the second virtual desktop session over the virtual channel using a remote display protocol.

5. The method of claim 4, wherein the data in the clipboard of the first virtual desktop session is encrypted when transferred using the remote display protocol.

6. The method of claim 1, further comprising:
receiving the request from the first user to share the clipboard data with the second user;
determining all active virtual desktops that the second user is currently logged into; and
sending the request to share the clipboard data to each of all active virtual desktops.

7. The method of claim 1, further comprising:
receiving a request to end clipboard data sharing from either the first virtual desktop session or the second virtual desktop session; and
discontinuing redirecting the data in the clipboard of the first virtual desktop session to the clipboard of the second virtual desktop session.

8. A computing system, comprising:
at least one processor; and
memory including instructions that, when executed by the at least one processor, cause the computing system to perform the steps of:
in a first virtual desktop session authenticated by a connection server for a first user on a first client device, receiving a request to share clipboard data with a second virtual desktop session authenticated by the connection server for a second user on a second client device;
sending, by the connection server, the request to the second virtual desktop session;
displaying, on the second virtual desktop session, an indication that the clipboard data of the first virtual desktop session is requested to be shared with the second virtual desktop session and an option for the second user to approve the request the request to share the clipboard data;
receiving, from the connection server, a response from the second virtual desktop session to the first virtual desktop session, indicating that the request to share the clipboard data has been approved and identifying the second virtual desktop session;
establishing, based on the response by a first endpoint on the first client device in cooperation with a second endpoint on a second client device, a virtual channel between the first virtual desktop session and the second virtual desktop session;
detecting a cut/copy operation that places data into a clipboard of an operating system (OS) of the first virtual desktop session; and
redirecting the data in the clipboard of the first virtual desktop session to a clipboard of the second virtual desktop session over the virtual channel.

9. The computing system of claim 8, wherein the data is an image or text, and wherein the memory further comprises instructions for:
in the second virtual desktop session,
receiving the image or text from the first virtual desktop session and storing the received image or text into the clipboard of an OS of the second virtual desktop session;
detecting a paste operation; and
retrieving the image or text from the clipboard of the second virtual desktop session in response to the paste operation.

10. The system of claim 8, wherein the data is a file or folder, and wherein the memory further comprises instructions for:

in the second virtual desktop session,
receiving a path associated with the file or folder from the first virtual desktop session and storing the path into the clipboard of an OS of the second virtual desktop session;
detecting a paste operation;
sending, to the first virtual desktop session, a request to transfer the content of the file or folder from the first virtual desktop session to the second virtual desktop session, the request including the path; and
receiving the content of the file or folder from the first virtual desktop session in response to the request.

11. The system of claim 8, wherein redirecting the data in the clipboard of the first virtual desktop session to the clipboard of the second virtual desktop session further comprises:
transmitting the data in the clipboard of the first virtual desktop session to the second virtual desktop session over the virtual channel using a remote display protocol.

12. The system of claim 8, further comprising:
receiving the request from the first user to share the clipboard data with the second user;
determining all active virtual desktops that the second user is currently logged into; and
sending the request to share the clipboard data to each of all active virtual desktops.

13. The system of claim 8, wherein the memory further comprises instructions for:
receiving a request to end clipboard data sharing from either the first virtual desktop session or the second virtual desktop session; and
discontinuing redirecting the data in the clipboard of the first virtual desktop session to the clipboard of the second virtual desktop session.

14. A non-transitory computer readable storage medium comprising one or more sequences of instructions, the instructions when executed by one or more processors causing the one or more processors to execute the operations of:
in a first virtual desktop session authenticated by a connection server for a first user on a first client device, receiving a request to share clipboard data with a second virtual desktop session authenticated by the connection server for a second user on a second client device;
sending, by the connection server, the request to the second virtual desktop session;
displaying, on the second virtual desktop session, an indication that the clipboard data of the first virtual desktop session is requested to be shared with the second virtual desktop session and an option for the second user to approve the request the request to share the clipboard data;
receiving, from the connection server, a response from the second virtual desktop session to the first virtual desktop session, indicating that the request to share the clipboard data has been approved and identifying the second virtual desktop session;
establishing, based on the response by a first endpoint on the first client device in cooperation with a second endpoint on a second client device, a virtual channel between the first virtual desktop session and the second virtual desktop session;
detecting a cut/copy operation that places data into a clipboard of an operating system (OS) of the first virtual desktop session; and redirecting the data in the clipboard of the first virtual desktop session to a clipboard of the second virtual desktop session over the virtual channel.

15. The non-transitory computer readable storage medium of claim 14, wherein the data is an image or text, and further comprising instructions for:
in the second virtual desktop session,
receiving the image or text from the first virtual desktop session and storing the received image or text into the clipboard of an OS of the second virtual desktop session;
detecting a paste operation; and
retrieving the image or text from the clipboard of the second virtual desktop session in response to the paste operation.

16. The non-transitory computer readable storage medium of claim 14, wherein the data is a file or folder, and further comprising instructions for:
in the second virtual desktop session,
receiving a path associated with the file or folder from the first virtual desktop session and storing the path into the clipboard of an OS of the second virtual desktop session;
detecting a paste operation;
sending, to the first virtual desktop session, a request to transfer the content of the file or folder from the first virtual desktop session to the second virtual desktop session, the request including the path; and
receiving the content of the file or folder from the first virtual desktop session in response to the request.

17. The non-transitory computer readable storage medium of claim 14, wherein redirecting the data in the clipboard of the first virtual desktop session to the clipboard of the second virtual desktop session further comprises:
transmitting the data in the clipboard of the first virtual desktop session to the second virtual desktop session over the virtual channel using a remote display protocol.

18. The non-transitory computer readable storage medium of claim 14, further comprising instructions for:
receiving the request from the first user to share the clipboard data with the second user;
determining all active virtual desktops that the second user is currently logged into; and
sending the request to share the clipboard data to each of all active virtual desktops.

* * * * *